United States Patent
Unterkofler et al.

(10) Patent No.: US 10,830,666 B2
(45) Date of Patent: Nov. 10, 2020

(54) CONTACT LENS INSPECTION METHOD AND SYSTEM

(71) Applicant: Novartis AG, Basel (CH)

(72) Inventors: Sarah Unterkofler, Hanau (DE);
Susanne Fechner, Aschaffenburg (DE);
Marcus Heift, Aschaffenburg (DE);
Matthias Schwab, Amorbach (DE)

(73) Assignee: Alcon Inc., Fribourg (CH)

( * ) Notice: Subject to any disclaimer, the term of this patent is extended or adjusted under 35 U.S.C. 154(b) by 359 days.

(21) Appl. No.: 15/797,257

(22) Filed: Oct. 30, 2017

(65) Prior Publication Data

US 2018/0120199 A1    May 3, 2018

Related U.S. Application Data

(60) Provisional application No. 62/414,900, filed on Oct. 31, 2016.

(51) Int. Cl.
*G01M 11/08* (2006.01)
*G01N 21/95* (2006.01)
*G01M 11/02* (2006.01)

(52) U.S. Cl.
CPC .... *G01M 11/0271* (2013.01); *G01M 11/0221* (2013.01); *G01M 11/0278* (2013.01);
(Continued)

(58) Field of Classification Search
CPC ......... G01M 11/0221; G01M 11/0207; G01M 11/0271; G01M 11/0278; G01M 11/081;
(Continued)

(56) References Cited

U.S. PATENT DOCUMENTS 5,491,524 A * 2/1996 Hellmuth ............... A61B 3/102
351/205

6,004,314 A * 12/1999 Wei ......................... A61B 3/102
606/12

(Continued)

FOREIGN PATENT DOCUMENTS

WO        2007/140220 A2    12/2007
WO    WO-2007140220 A2 * 12/2007 .......... G01M 11/025
(Continued)

OTHER PUBLICATIONS https://web.archive.org/web/20160205025211/https://www.allaboutvision.com/contacts/faq/inside-out.htm (Year: 2016).*
(Continued)

*Primary Examiner* — Travis S Fissel
(74) *Attorney, Agent, or Firm* — Sheng-Hsin Hu (57) ABSTRACT

A method for determining the inversion state of a soft contact lens (1), comprising imaging a soft contact lens having a convex surface (2, 3) and a concave surface (3, 2), a lens center and a lens edge (5) surrounding said soft contact lens (1), the method comprising using an optical coherence tomography system to obtain at least one sectional image of at least a part of the contact lens (1) comprising the lens edge (5), determining a cross-sectional edge geometry of the contact lens (1) extending from the lens edge (5) towards the lens center of the contact lens in the sectional image, the cross-sectional edge geometry corresponding to the convex and concave surface boundaries of the contact lens (1) in the sectional image, selecting a parameter defining the cross-sectional edge geometry of the contact lens (1) imaged and comparing the parameter defining the cross-sectional edge geometry of the contact lens (1) with a predetermined parameter defining a cross-sectional edge geometry of a non-inverted contact lens to determine whether said contact lens (1) is inverted.

9 Claims, 6 Drawing Sheets

(52) U.S. Cl.
CPC ...... *G01M 11/081* (2013.01); *G01M 11/0207* (2013.01); *G01N 21/9515* (2013.01)

(58) Field of Classification Search
CPC .. G01M 21/9515; G01B 9/02; G01B 9/02091
USPC ........ 351/159.02, 159.73, 178; 356/450, 900
See application file for complete search history.

(56) References Cited

U.S. PATENT DOCUMENTS

| | | | | |
|---|---|---|---|---|
| 9,016,860 | B2* | 4/2015 | Peyman | A61F 2/1627 351/205 |
| 2012/0133957 | A1* | 5/2012 | Widman | G01B 11/06 356/624 |
| 2014/0092395 | A1* | 4/2014 | Fechner | G01M 11/0207 356/517 |
| 2015/0031993 | A1* | 1/2015 | Buckland | A61B 3/103 600/425 |
| 2016/0018327 | A1* | 1/2016 | Hogan | A61B 5/0073 356/479 |
| 2017/0027437 | A1* | 2/2017 | Neal | A61B 3/107 |

FOREIGN PATENT DOCUMENTS

| | | |
|---|---|---|
| WO | 2009/006361 A1 | 1/2009 |
| WO | 2015/036432 A1 | 3/2015 |

OTHER PUBLICATIONS

Kaluzny, B, J. et al; Spectral Optical Coherence Tomography: A New Imaging Technique in Ontact Lens Practice; Ophthalmic and Physiological Optics; The College of Optometrists, vol. 26, No. 2, 2006, pp. 127-132.

* cited by examiner

CONTACT LENS INSPECTION METHOD AND SYSTEM

This application claims the benefits under 35 USC § 119 (e) of U.S. provisional application No. 62/414,900 filed 31 Oct. 2016, herein incorporated by reference in its entirety.

FIELD

The invention relates to a contact lens inspection system and method for the inspection of soft contact lenses as to whether or not they are inverted, i.e. flipped inside out, and optionally their orientation or their position in the container, particularly in an automated contact lens manufacturing line.

BACKGROUND

Soft contact lenses from a wide range of materials are nowadays produced in great volumes in highly automated manufacturing lines. To ensure top quality of the manufactured contact lenses, the final contact lenses are optically inspected prior to packaging. Because contact lenses are intended for use on the eye, great care must be taken to make sure that the lenses meet strict quality standards.

Soft contact lenses may become inverted (flipped inside out) due to the manufacturing process or on their passage through different handling and treatment stations during the automated manufacturing, meaning that the rear face of the contact lens, which is normally concavely shaped to come into contact with the eye of the wearer, is protruding convexly outwardly while the front face of the contact lens is inverted to a concave shape. In principle, such an inverted contact lens still may provide the desired optical corrective power; however, the comfort to the wearer of such inverted contact lens may be lowered due to decreased fit to the eyeball. Additionally, during inspection the lens may be considered as being out of specification by not meeting standard criteria due to the lens inversion, thereby being discarded although the lens is actually not defective. Generally, the manufacturing process is designed to minimize the inversion rate (the number of inverted lenses relative to the total number of lenses manufactured).

On the manufacturer's side this means that inverted soft contact lenses must be reliably detected, for example in the inspection step indicating a need for action, for example re-inverting the lens to have its proper orientation for another inspection before or at the time of being packaged. Alternatively, a large amount of inverted lenses may be an indication for a manufacturing process which does not run optimally, thereby indicating a need for optimization of the manufacturing process.

In general, many inverted soft contact lenses may be detected by a relatively simple measurement. However, certain deviations of the measured parameter from the predetermined set parameter must be tolerated due to the automation of the lens manufacturing process, which may lead in some instances to improper results in the detection of inverted contact lenses. This may lead to an inverted soft contact lens being identified as being non-inverted and, consequently, such incorrectly identified "non-inverted" soft contact lens could be placed in a package.

Accordingly, there is a need for a more accurate contact lens inspection system and method, in particular for soft contact lenses. A contact lens inspection system and method shall be provided, which is relatively simple, fully automatable, and which provides accurate results in particular with regard to the detection of inverted soft contact lenses. The contact lens inspection system and method shall be in particular capable of being combined with and integrated into an automated manufacturing line for contact lenses.

SUMMARY

Throughout the entire specification including the appended claims, the singular forms "a", "an", and "the" include the plural, unless the context explicitly dictates otherwise. Also, whenever features are combined with the term "or", the term "or" is to be understood to also include "and" unless it is evident from the specification that the term "or" must be understood as being exclusive.

The present invention suggests a method for determining the inversion state of a soft contact lens, comprising imaging a soft contact lens having a convex surface and a concave surface, a lens center and a lens edge surrounding said soft contact lens, the method comprising using an optical coherence tomography system to obtain at least one sectional image of at least a part of the contact lens comprising the lens edge, determining a cross-sectional edge geometry of the contact lens extending from the lens edge towards the lens center of the contact lens in the sectional image, the cross-sectional edge geometry corresponding to the convex and concave surface boundaries of the contact lens in the sectional image, selecting a parameter defining the cross-sectional edge geometry of the contact lens imaged and comparing the parameter defining the cross-sectional edge geometry of the contact lens with a predetermined parameter defining a cross-sectional edge geometry of a non-inverted contact lens to determine whether said contact lens is inverted.

In some embodiments of the contact lens inspection system according to the invention, said step of determining the cross-sectional edge geometry comprises determining a lens edge curvature radius of the convex surface or of the concave surface of the contact lens and the steps of selecting and comparing the parameter of the cross-sectional edge geometry comprise selecting the lens edge curvature radius of the convex surface or of the concave surface of the contact lens as parameter defining the cross-sectional edge geometry and comparing said lens edge curvature radius with a predetermined lens edge curvature radius.

In some embodiments of the method according to the invention, said step of determining whether said contact lens is inverted comprises evaluating whether the determined lens edge curvature radius of the contact lens deviates more than 50%, particularly more than 20%, very particularly more than 10% from the predetermined lens edge curvature radius.

In some further embodiments of the method according to the invention, said at least one sectional image further comprises the lens center, wherein the method further comprises determining a lens diameter of the contact lens and wherein the method further comprises comparing the determined lens diameter with a predetermined lens diameter of a non-inverted contact lens to determine whether said contact lens is inverted.

In some specific embodiments of the method according to the invention, said at least one sectional image further comprises the lens center, wherein the method further comprises determining a sagittal depth of the contact lens, and wherein comparing the determined sagittal depth with a predetermined sagittal depth of a non-inverted contact lens to determine whether said contact lens is inverted.

In some embodiments of the method according to the invention, said contact lens is imaged in a container, particularly in an inspection cuvette or in a base part of a blister package.

In some specific embodiments of the method according to the invention, said contact lens is imaged while placed in a volume of liquid in the container.

A further aspect of the invention is directed to a contact lens inspection system, wherein the sectional image is used to further determine the orientation of the contact lens in the container.

In some embodiments of the contact lens system according to the invention, said sectional image is used to further determine the Cartesian position of the contact lens in the container.

In accordance with a further aspect of the invention from the evaluation of the interference pattern a three-dimensional image of the contact lens may be computed and optionally displayed.

In some further embodiments of the contact lens inspection system according to the invention, said contact lens is a silicone hydrogel lens.

In another aspect, the invention suggests a contact lens inspection system for soft contact lenses, comprising:
a light source for emitting a light beam;
a lens for forming a collimated light beam from the light beam emitted from the light source; and
an interferometer comprising:
a beam splitter configured for receiving the collimated light beam and for dividing the collimated light beam into a reference beam and a sampling beam;
a reference arm to receive the reference beam from the beam splitter and including a reference mirror for reflecting reference light to the beam splitter;
a sampling arm for receiving a sampling beam from the beam splitter and for directing the sampling beam onto the contact lens to generate a sampling light reflected from the contact lens;
wherein the beam splitter is further configured for receiving and combining the reflected reference light signal from the reference arm and the reflected sampling light from the sampling arm to generate an interference signal comprising an interferogram based on the reflected reference and sampling light signals;
a detector arm including a detector configured to receive the interference signal from the beam splitter and to generate an output signal which is convertible into a digitalized optical coherence tomography image of the contact lens and
an electronic scanning and evaluation unit configured to electronically scanning at least one portion of said optical coherence tomography image of said contact lens on said detector comprising a lens edge, in order to detect within said portion of said optical coherence tomography image comprising the lens edge of said contact lens a cross-sectional edge geometry extending from the lens edge towards a lens center of the contact lens, and for comparing a parameter defining said cross-sectional edge geometry with a predetermined parameter defining a cross-sectional edge geometry of a non-inverted contact lens to determine whether said contact lens is inverted.

In still some further embodiments of the invention, said contact lens inspection system further comprises a container for holding a contact lens and allowing unobstructed impingement of the sample light beam on the contact lens held in the container and unobstructed exit of reflected sampling light signal from the contact lens out of the container, which container particularly may be filled with an aqueous liquid, such as water, for example deionized water, or a buffered solution, such as a buffered saline solution, or mixtures thereof.

In some specific embodiments of the contact lens inspection system, said electronic scanning and evaluation unit is further configured to determine the orientation of the contact lens in the container.

In still some further embodiments of the contact lens inspection system, said electronic scanning and evaluation unit is further configured to determine the Cartesian position of the contact lens in the container.

An inverted soft contact lens has a specific cross-sectional edge geometry which deviates from the cross-sectional edge geometry of a non-inverted soft contact lens. In particular, in case of a soft contact lens having a spherical base curve, the shape of the lens does not follow the spherical shape of the base curve of the lens adapted to the cornea of the wearer's eye.

The present methods permit the determination of the inversion state of a soft contact lens with high accuracy by using optical coherence tomography to obtain and evaluating the cross-sectional edge geometry of the contact lens extending from the lens edge towards the lens center of the contact lens in the sectional image obtained by the optical coherence tomography. Using the present methods, lens features, in particular cross-sectional contact lens edge, sagittal depth of the lens and lens position can be determined. The present methods use an optical coherence tomography (OCT) system to produce one or more images of a lens being measured, as described herein. By lens center is meant the center of the physical contact lens.

Optical Coherence Tomography uses light of relatively short coherence length which is applied to a scattering sample, and with the aid of an interferometer the distances to scattering points of the sample is measured. The scattering sample is scanned point by point and from the resulting interference patterns in the interferogram a high resolution image of the scanned sample may be deduced. From the evaluation of the interference pattern a three-dimensional image of the contact lens may be computed by scanning the whole contact lens.

Additionally to the inversion state, the present method may allow for detecting further states of the contact lens in the inspection system, such as several lenses a pile of lenses, half-inverted lenses, lenses not floated into position, etc. The method may also allow for determination of the lens thickness and lens surface shapes among other things.

Additionally, the method and system may comprise obtaining at least one sectional image of the contact lens comprising both lens edges situated on both sides of the sectional image, determining the cross-sectional edge geometry of the contact lens of both lens edges and comparing a parameter defining the cross-sectional edge geometry of the contact lens for both lens edges for enhanced determination of the inversion state of the contact lens.

Determining the lens edge curvature radius of the convex surface or of the concave surface of the contact lens and comparing said lens edge curvature radius with a predetermined lens edge curvature radius is a particularly reliable method for determining the inversion state of a soft contact lens. In particular, the lens edge curvature radius of the convex surface is selected as parameter defining the cross-ssectional edge geometry of the contact lens. In particular, the deviation of the determined lens edge curvature radius of the contact lens from the predetermined lens edge curvature radius allows for fine tuning the accuracy of the determination of the inversion state of the soft contact lens.

Further determining and comparing the determined lens diameter with a predetermined lens diameter of a non-inverted contact lens to determine whether said contact lens is inverted further enhances the accuracy of the method. Similar considerations hold for the sagittal depth of the measured contact lens, which may be further combined with the determination and evaluation of the cross-sectional edge geometry alone or with the determination and evaluation of the lens diameter.

The method is particularly suited for imaging a contact lens in a container, in particular in an inspection cuvette or in a base part of a blister package.

The method allows for additional determination of the orientation of the contact lens in the container or of the Cartesian position of the contact lens in the container. The Cartesian position of the contact lens may be determined using the center of the cuvette as origin or any other predetermined origin.

The method is particularly suited for imaging a silicone hydrogel lens.

The light source is adapted to the use in the optical coherence tomography. In particular, a low coherence light source emitting a low coherence light beam is used as light source. The low coherence light beam may, for example, be generated by a superluminescent diode (SLD). A laser may also be used as light source.

In order to improve the signal-to-noise ratio in the method for inspecting a contact lens, using optical coherence tomography in accordance with the invention the sample light beam may be provided from a light source having a power of at least 2 mW at a wavelength in the near infrared (NIR) region of the electromagnetic spectrum.

The contact lens to be inspected may be additionally manufactured such that it comprises scattering centers. The scattering centers may be embedded in and/or on an anterior surface and in and/or on a posterior surface thereof, respectively, and/or distributed throughout a bulk material, which is delimited by the anterior surface and the posterior surface of the contact lens. An interference pattern resulting from a superposition of reflected light from a defined sample volume including the contact lens to be inspected and a reference light beam provided from the light source may be analyzed. Refractive effects of the contact lens and of the surrounding sample volume may be removed from the raw data of the image corresponding to the section of the inspected contact lens, in order to obtain geometrical data at least of the edge of the inspected contact lens. The geometrical data may then be transformed into CAD-readable data representing the inspected contact lens.

The scattering centers may be one of phase interfaces, boundary surfaces in between components, of which the contact lens is made, such as, e.g. boundary surfaces in between silicon and a hydrogel, scattering particles, and combinations thereof.

The scattering centers may be or may include scattering particles, which may be formed within and/or on the contact lens only during the manufacture process thereof. It may prove advantageous, if the scattering particles are pigments, such as e.g. may be used to manufacture contact lenses having a desired color.

For the inspecting process the contact lens may be placed within a container, allowing an unobstructed incidence of the sample light beam to the contact lens and an unobstructed emergence of back-scattered light from the container. In an exemplary embodiment for the above-mentioned purpose the container may e.g. be provided with a window. The container preferably may be filled with an aqueous liquid, such as water, including deionized water, or a buffered solution, such as a buffered saline solution, or mixtures thereof. The wavelength of the light source may be optimized with respect to the aqueous solution, which has a minimum of absorption in the wavelength range from 1040 nm to 1100 nm. It should be noted though, that the inspection of the contact lens using Optical Coherence Tomography may also be performed in air. Having the contact lens immersed in aqueous liquid, however, is preferred, because the lens should be kept hydrated for proper and reproducible determination of specified parameters.

From the evaluation of the interference pattern, a three-dimensional image of the contact lens may be computed (so called c-scan). For the achievement of a corrected mechanical model of the contact lens the raw data resulting from the evaluation of the interference pattern may be subjected to an inverse raytracing.

By the application of a smoothing method such as, e.g. inverse raytracing, which may also be designated as Dewarping, a mechanical model of the contact lens may be determined which may be represented by CAD data. By an application of OCT in a first step a 3-D image (c-scan) of the contact lens may be obtained. The 3-D image corresponds to points of increased intensity within a scanned volume. By a process called segmentation the 3-D image of the contact lens may be separated from the scanned volume. In order to compensate optical distortions which result from the optical power of the contact lens the image data are subjected to a smoothing process, such as, e.g. inverse raytracing. The result is a corrected mechanical model of the contact lens, which may be represented by CAD data.

The determination whether a contact lens is inverted may then be performed on the basis of the 3-D image by computing at least one representation of at least one sectional image of the contact lens represented in the c-scan and determining the cross sectional edge geometry from the at least one representation. The method using a 3-D image of the contact lens allows for more accurate determination of the inversion state of the contact lens, as cross-sectional geometries of the contact lens may be determined at different positions through the contact lens. Additionally, the 3-D image allows for a more accurate determination of the section image passing the lens center for determining parameters such as the sagittal depth or the lens diameter.

The determination of cross-sectional edge geometries on basis of a 3-D image (c-scan) may, for example, additionally be of particular relevance for toric contact lenses. These toric contact lenses may have varying cross-sectional edge geometries along the circumference of the lens edge. The determination whether the contact lens is inverted may then be accurately deduced from the cross-sectional edge design of several positions around the circumference of the lens edge.

The method according to the invention may be employed to inspect physical properties of contact lenses and to control the quality of the manufacturing process thereof. The method may be employed in particular for the inspection and manufacture control of contact lenses. The contact lens can be a spheric or aspheric contact lens and may even be a multifocal or toric contact lens. The contact lens may be manufactured from the common contact lens materials, including silicone hydrogels. The method may be performed on hydrated or on unhydrated contact lenses. In order to obtain physical properties which reflect the properties of the contact lens in use, inspections of the hydrated contact lens are preferred.

The afore-mentioned embodiments are practical embodiments of determining the inversion state of a soft contact lens.

Further embodiments and advantages become apparent from the following description of detailed embodiments of the method and system according to the invention with the aid of the drawings.

It is to be noted, that every individual feature described herein as well as all combination of two or more of such features are possible as long as such features are not mutually exclusive or are otherwise technically incompatible.

BRIEF DESCRIPTION OF THE DRAWINGS

Further details and advantages of the invention will become apparent from the following description of exemplary embodiments of the invention with the aid of the drawings, in which:

FIG. 1b shows an enlarged view of the edge of the non-inverted and properly oriented soft contact lens of FIG. 1a;

FIG. 2b shows an enlarged view of the edge of the inverted soft contact lens of FIG. 2a;

FIG. 3a shows a cross-sectional view of a non-inverted (rightside out) and upside-down oriented soft contact lens of FIG. 1a;

FIG. 3b shows an enlarged view of the edge of the non-inverted and upside-down oriented soft contact lens of FIG. 3a;

FIG. 4a shows a cross-sectional view of an inverted (inside out) and upside-down oriented contact lens of FIG. 3a;

FIG. 4b shows an enlarged view of the edge of the inverted and upside-down oriented soft contact lens of FIG. 4a;

DETAILED DESCRIPTION

Figure 1A:
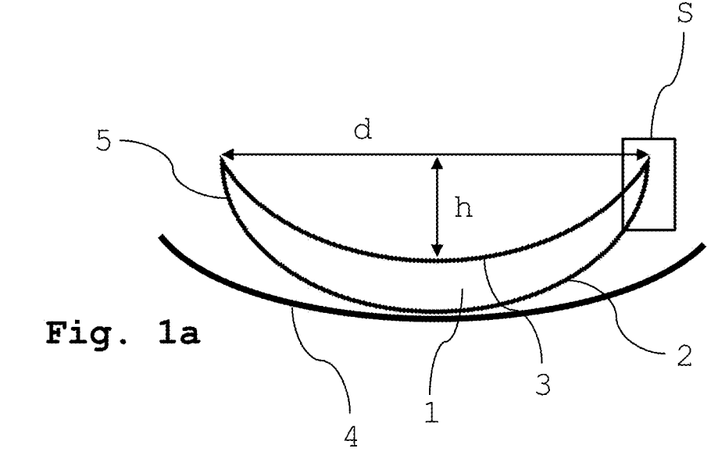
FIG. 1a shows a cross-sectional view of a non-inverted (rightside out) and properly oriented (i.e. rightside-down with respect to the container bottom) soft contact lens.

FIG. 1a shows a cross-sectional view of a non-inverted and properly oriented soft contact lens 1 with a correctly oriented front face 2 and rear face 3 resting on a support surface 4. In their proper orientation the front face 2 is convexly curved outwardly while the rear face 3 is concavely shaped. The concave back surface 3 of the lens has a base curve matching the wearer's cornea. The cross-sectional peripheral detail in the box S reveals a shape which may be approximated by a circle and corresponding to the posterior peripheral curve (bevel) of the rear face 3 towards the bevel of the contact lens 1.

Figure 1B:
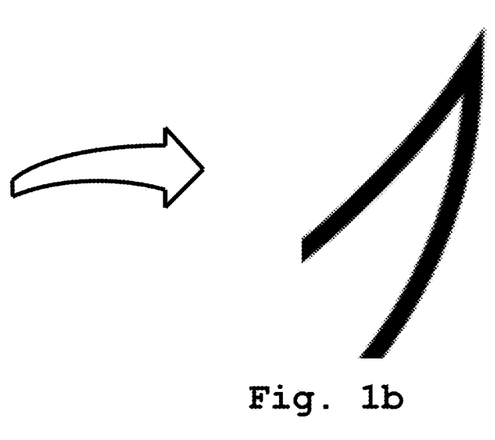

FIG. 1b shows a magnification of the cross-sectional edge of the lens shown in FIG. 1a. In this magnification, the edge geometry describes an arc of a circle having a posterior peripheral curve (bevel) radius of the back surface 3 of the lens 1.

Figure 2A:
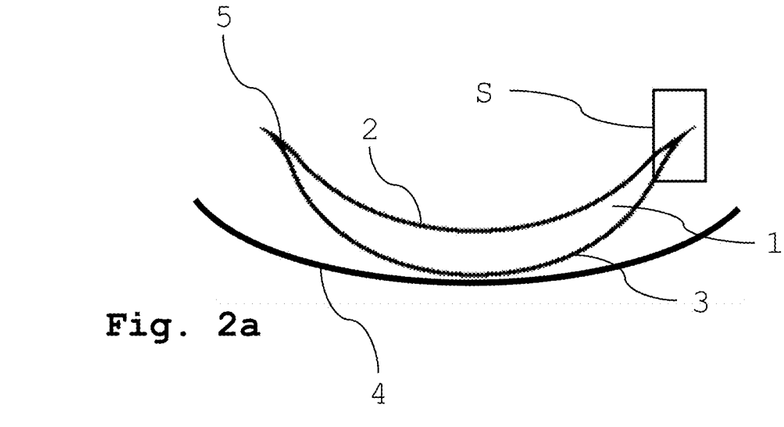
FIG. 2a shows a cross-sectional view of the properly oriented soft contact lens of FIG. 1a, in inverted (inside out) state.

FIG. 2a shows the same soft contact lens 1 in an inverted state (the lens of FIG. 1a has been inverted and turned around in FIG. 2a), where now, because the lens is inside-out, the front face 2 is concavely curved, while the rear face 3 is convexly curved outwardly. The lens 1 now rests on its rear face 3. With its flattened edge, the inverted contact lens 1 has a shape similar to that of a soup bowl.

Figure 2B:
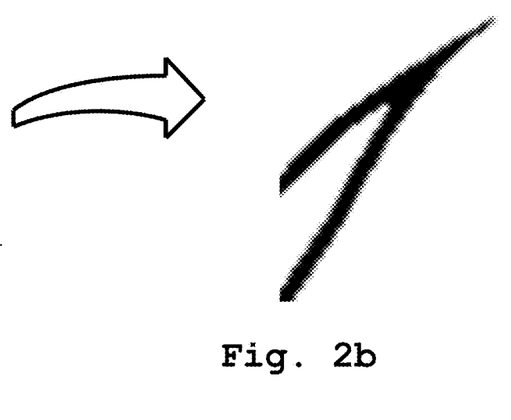

Considering the cross-sectional edge detail of the lens shown in FIG. 2a in the box S as shown in magnification in FIG. 2b reveals an edge geometry deviating from the circular shape of the non-inverted lens in the peripheral zone which does have low correlation with a predetermined curvature radius value corresponding to the curvature radius of a non-inverted contact lens at the lens edge.

Figure 3A:
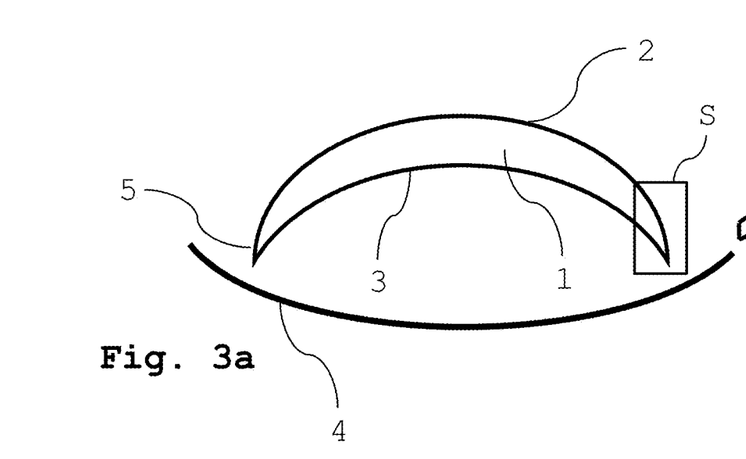
Figure 3B:
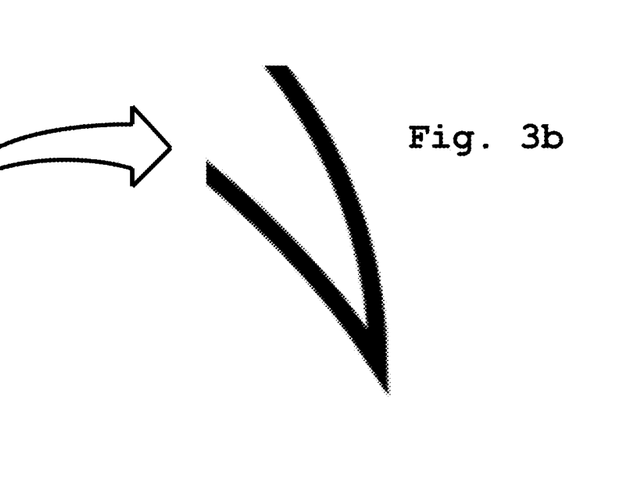
Figure 4A:
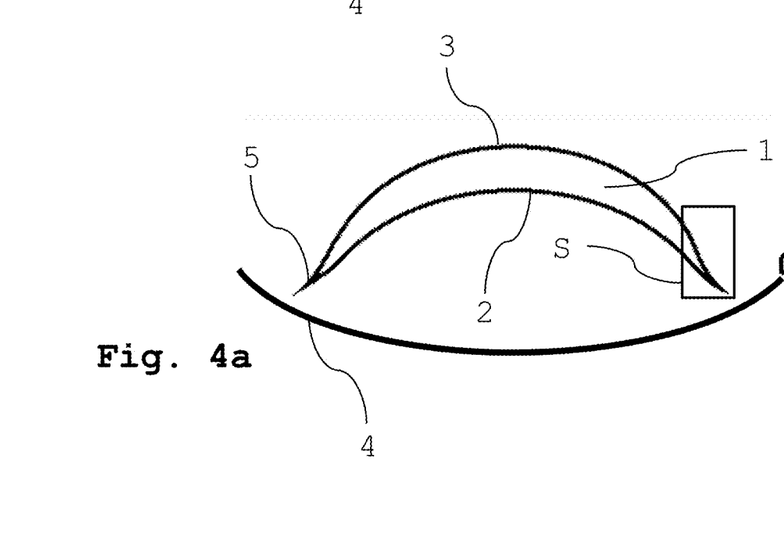
Figure 4B:
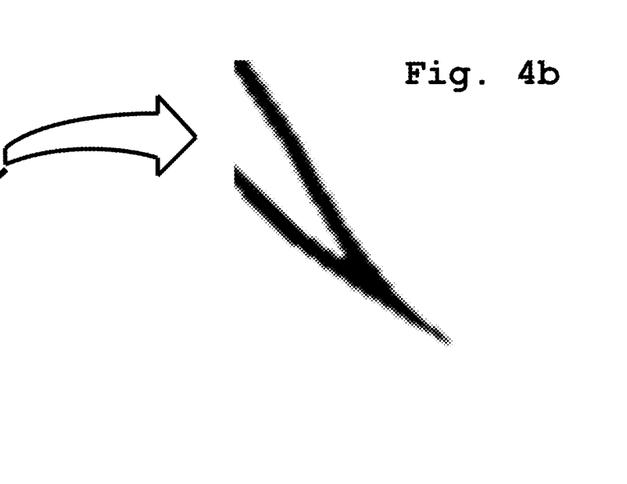

FIGS. 3a and b and FIGS. 4a and b show additional upside-down orientations of the soft contact lens with respect to a support surface inside the container. Again, FIGS. 3a and b show a non-inverted lens in an upside-down orientations whereas FIGS. 4a and b show an inverted lens in an upside-down orientations.

FIG. 5 to FIG. 8 show two-dimensional OCT sectional images (so-called b scans) of the contact lens 1, which have been computed from the evaluation of the interference pattern resulting from a superposition of back-scattered light from the lens and the reference light beam. The images show a sectioned view of the contact lens 1, without having to section the lens physically and thereby destroying the lens. For the measurement the contact lens 1 has been immersed in an aqueous liquid and rests on a lens support 4. The images are computed from raw data which are obtained from the evaluation of the interference pattern generated by the optical coherence tomography. In order to compensate optical distortions which result from optical elements (including the contact lens 1) and refractive index differences, and further in order to obtain corrected mechanical dimensions of the contact lens 1 the raw data may be subjected to a corrective algorithm. The arcs of circle 6 represent the predetermined curvature radius value expected for the corresponding contact lens 1 in the non-inverted state and shows the correlation between the lens edge curvature radius of the concave surface of the lens and the predetermined curvature radius value. In case of the non-inverted contact lens, the correlation is excellent whereas the lens edge curvature radius of the inverted contact lens substantially deviates from the predetermined curvature radius value. The amount of deviation in the actual (measured) curvature radius may be expressed as a percentage of the predetermined curvature radius by subtracting the two radii dividing the difference by the predetermined curvature value. In the example shown in FIG. 6, the lens edge curvature radius of the inverted contact lens is about 100% higher than the predetermined curvature radius value represented by the arc of a circle 6.

Additionally, the method for determining the inversion state of a soft contact lens may comprise determining a lens diameter d of the contact lens 1 (see FIG. 1a) which corresponds to the diameter of the lens edge and comparing the lens diameter d with a predetermined standard contact lens diameter of a non-inverted contact lens to determine whether or not said contact lens is inverted. An inverted soft contact lens has a slightly larger diameter than the same non-inverted soft contact lens.

Furthermore, the method for determining the inversion state of a soft contact lens may comprise determining the sagittal depth h of the contact lens 1 (see FIG. 1a) and comparing the sagittal depth h with a predetermined standard sagittal depth of a non-inverted contact lens to determine whether or not said contact lens is inverted. The sagittal depth h is the distance between the vertex of the concave surface at the physical center of the contact lens and the plane formed by the edge of the contact lens and in an orthogonal direction to the plane formed by the edge of the contact lens. An inverted soft contact lens has a slightly reduced sagittal depth h than the same non-inverted soft contact lens.

The determination of the cross-sectional edge geometry of the lens and comparison of the cross-sectional edge geometry of the lens with a predetermined parameter may be combined with the comparison of the lens diameter d with a predetermined standard contact lens diameter or the comparison of the sagittal depth h with a predetermined standard sagittal depth or both methods for further enhancing the accuracy of the determination whether or not the contact lens is inverted.

Figure 5:
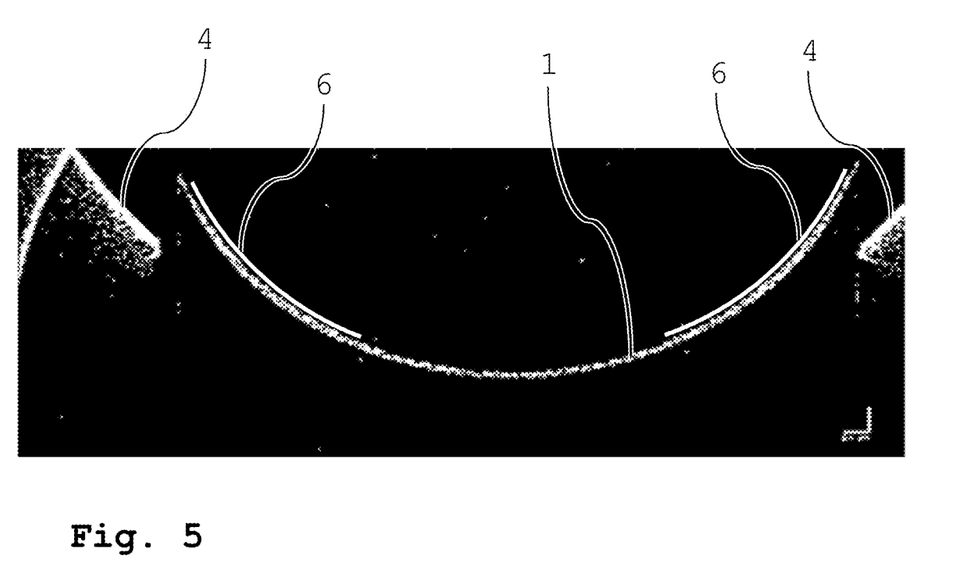
FIG. 5 shows an OCT sectional image (b scan) of a non-inverted contact lens in the correct orientation on the lens holder.
Figure 6:
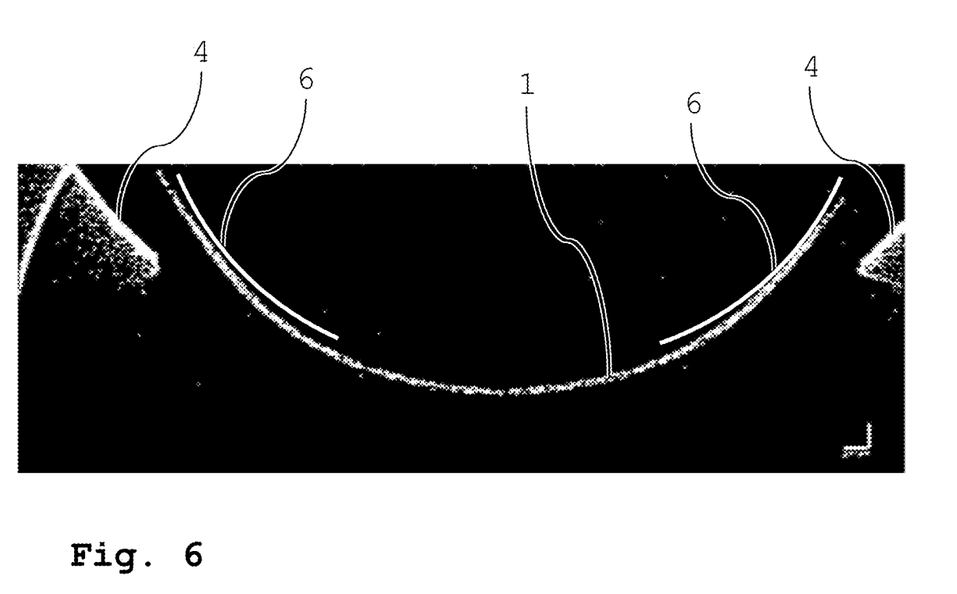
FIG. 6 shows an OCT sectional image (b scan) of an inverted contact lens in the correct orientation on the lens holder.
Figure 7:
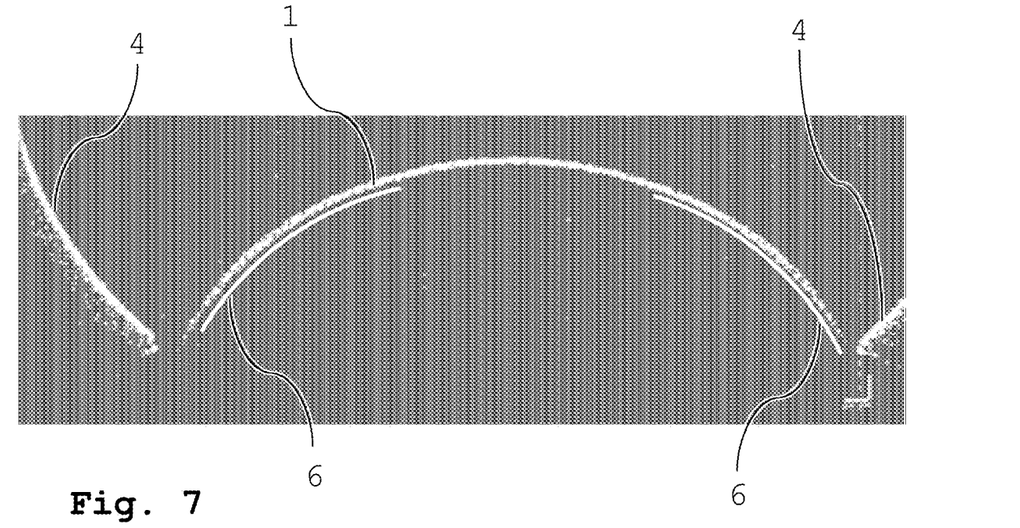
FIG. 7 shows an OCT sectional image (b scan) of a non-inverted contact lens upside down on the lens holder.
Figure 8:
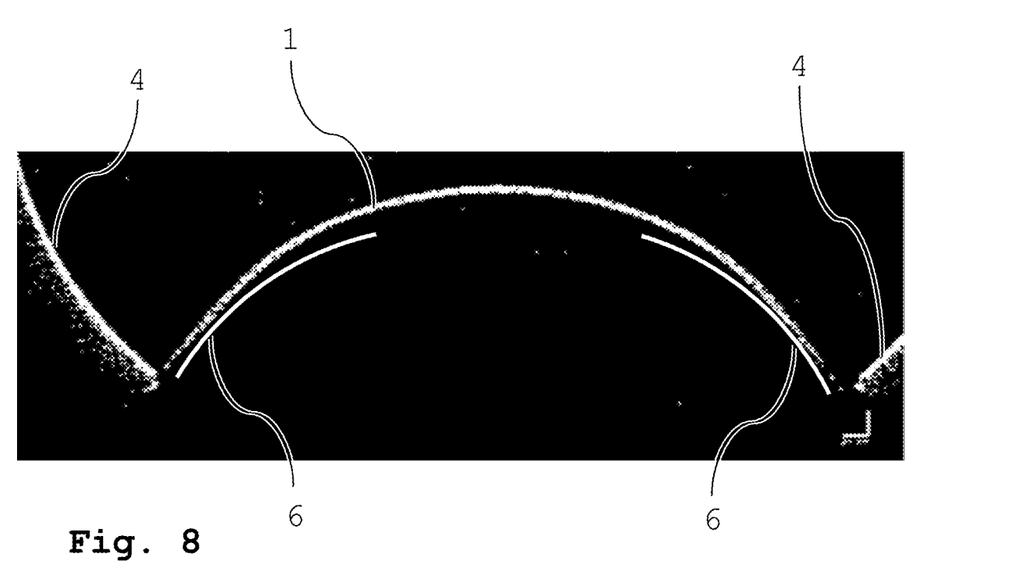
FIG. 8 shows an OCT sectional image (b scan) of an inverted contact lens upside down on the lens holder.

The FIGS. 5 and 6 respectively show a non-inverted and an inverted lens 1 in the proper orientation on the lens holder 4, whereas FIGS. 7 and 8 respectively show a non-inverted and an inverted lens 1 in an upside-down orientation on the lens holder 4.

The sectional image may furthermore be used to determine the orientation (upside-down) of the contact lens in the container for example via a negative lens edge curvature radius.

For better accuracy of the method for determining the inversion state of a soft contact lens, a sectional image of the entire contact lens comprising both lens edges as shown in the FIGS. 5 to 8 may be evaluated and the cross-sectional edge geometry determined for both lens edges and compared with a predetermined curvature radius value.

Figure 9:
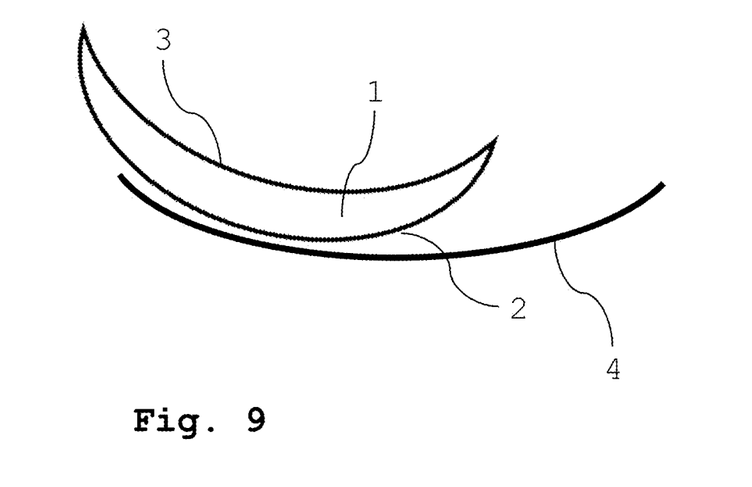
FIG. 9 shows a cross-sectional view of a non-inverted soft contact lens which is decentered on the lens holder.

FIG. 9 shows a cross-sectional view of a non-inverted and properly oriented soft contact lens 1 which is decentered on the lens holder, in other words which is not situated at the center of the lens holder. The Cartesian position of the lens on the lens holder is however an important parameter for correct reception of the lens by the gripper which will then transfer the lens for example to the packaging station. In case the gripper does not receive the contact lens properly, the transfer of the contact lens could for instance fail or lead to unsuitable positioning of the contact lens during blistering.

Figure 10:
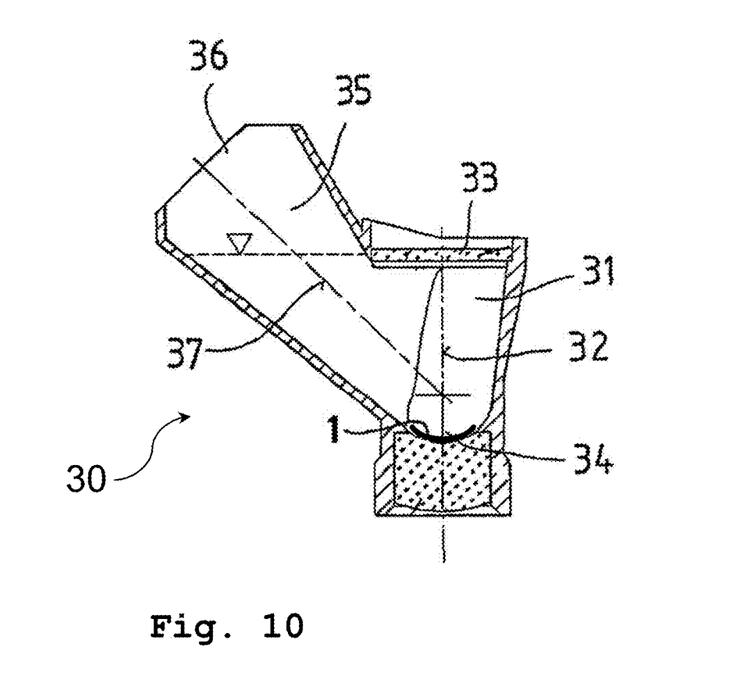
FIG. 10 shows an embodiment of a cuvette for the contact lens inspection system according to the invention.

The container shown in FIG. 10 is an embodiment of an inspection cell 30 which is suitable for performing the method according to the invention. The inspection cell in FIG. 10 has a hollow space 31 which is filled with a liquid, for example water. The hollow space 31 extends along an axis 32 which, in the position shown in FIG. 10, coincides with the optical axis of the optical inspection system. From above, the hollow space 31 is delimited by a viewing glass 33. The lower area of the hollow space 31 has a concave bottom surface 34 in which the contact lens 1 is received in the represented position.

Opening into the hollow space 31 there is an insertion channel 35 which has an outer opening 36 through which the contact lens 1 can be inserted into or removed from the hollow space 31 by a gripper. The insertion channel extends substantially rectilinearly along an axis 37 which is at an angle of about 45° to the axis 32 of the hollow space 31. The liquid filling the cell 30 contacts the viewing glass 33 and allows for a planar entry surface through the viewing glass 33 and then passing from the viewing glass 33 into the liquid towards the soft contact lens 1.

Figure 11:
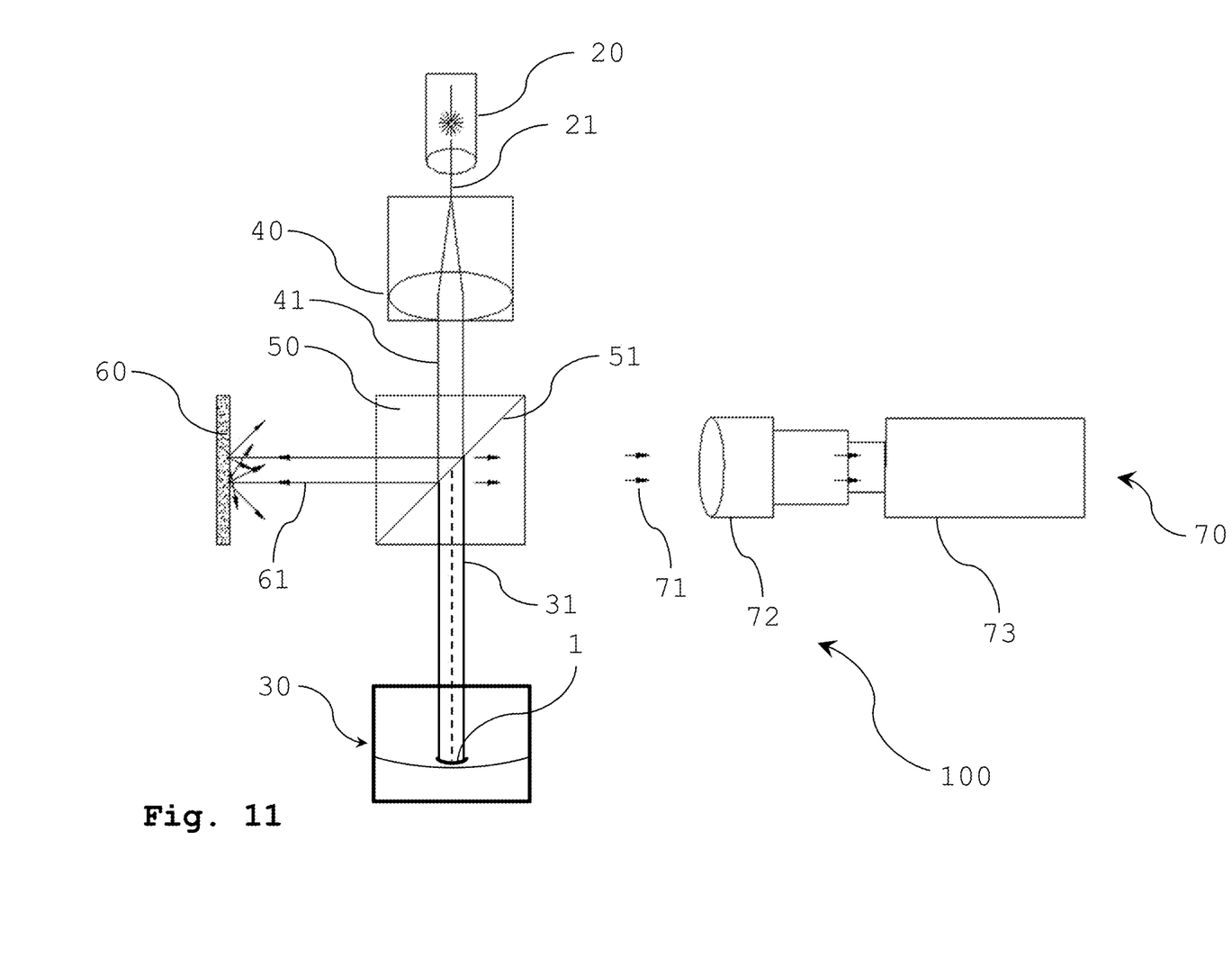
FIG. 11 shows an embodiment of a contact lens inspection system according to the invention.

FIG. 11 shows a schematic view of an embodiment of a contact lens inspection system according to the invention. The contact lens inspection system 100 comprises a low-coherence light source 20, a lens 40 for forming a collimated light beam and an interferometer 50. The interferometer comprises a beam splitter 51 receiving the collimated light beam from the light source 20 and dividing the light beam into a reference beam and a sampling beam. A reference arm includes a reference mirror 60 and receives a reference beam from the beam splitter 51 of the interferometer 50 and returns reflected reference light signals to the beam splitter 51. The contact lens inspection system 100 further comprises a sampling arm receiving a sampling beam from the beam splitter 51 of the interferometer 50 and simultaneously scans the sampling beam onto the contact lens 1 in a cuvette 30.

The beam splitter 51 in the interferometer 50 further receives and combines the reflected reference light signal 61 from the reference arm and reflected sampling light 31 signal returned from the contact lens 1 to generate an interference signal 71 comprising an interferogram based on the reflected reference light signal 61 and sampling light signal 31.

The interference signal 71 is then guided over a detector arm including a camera 70 comprising an objective lens 72 and an electronic sensor 73, for example a CCD-sensor or CMOS-sensor. The electronic sensor 73 is configured to obtain the interference signal from the beam splitter 51 and to generate an output signal convertible into a digitalized optical coherence tomography image of the contact lens.

The signal generated by the camera 70 is then scanned and evaluated by an electronic scanning and evaluation unit configured to electronically scanning at least one portion of said optical coherence tomography image of said contact lens 1 on said camera 70 comprising the lens edge to detect within said section S of said optical coherence tomography image of said contact lens 1 a curvature radius of said lens edge, and for comparing said lens edge curvature radius with a predetermined curvature radius to determine whether or not said contact lens 1 is inverted.

The light source 20 is arranged on top of the viewing glass 33 of the container 30, and illuminates the soft contact lens 1 with low-coherence light which has been collimated by a collimation lens 40. Depending on the light source, no collimation lens 40 is necessary. The container viewing glass 33 is transparent to the light from the sampling beam 31 impinging thereon. The soft contact lens 1 may be supported inside the container 30 on the concave inner surface of the container bottom 33.

The camera 70 is connected via a data line with a scanning and evaluation unit. In the scanning and evaluation unit, either a portion of the digitalized optical coherence tomography image of the soft contact lens 1 or the entire digitalized optical coherence tomography image of the contact lens is electronically scanned, for example sequentially, in sections of a predetermined size, and the cross-sectional edge geometry is detected. The lens edge curvature radius of the concave surface of the contact lens is detected in the cross-sectional edge geometry, and the resulting lens edge curvature radius is compared with a predetermined value in order to determine whether or not the inspected soft contact lens 1 within said container is inverted. If the soft contact lens 1 is found to be inverted, action may be initiated. For example, the soft contact lens 1 may be re-inverted again to its non-inverted orientation prior to the soft contact lens 1 being placed in a package. Alternatively, the process parameter of the manufacturing line may be optimized in order to reduce the proportion of inverted lenses introduced into the inspection cuvette.

Although the invention has been described with the aid of specific embodiments, it is evident to the person skilled in the art that this embodiment has been described by way of example only, but representing the general inventive concept, and that various changes and modifications can be made without departing from the technical teaching underlying the invention. Therefore, the invention is not intended to be limited by the embodiment described, but rather is defined by the appended claims and their equivalents.

The invention claimed is:

1. Method for determining the inversion state of a soft contact lens (1), comprising
    imaging a soft contact lens having a convex surface (2, 3) and a concave surface (3, 2), a lens center and a lens edge (5) surrounding said soft contact lens (1), the method comprising using an optical coherence tomography system to obtain at least one sectional image of at least a part of the contact lens (1) comprising the lens edge (5),
    determining a cross-sectional edge geometry of the contact lens (1) extending from the lens edge (5) towards the lens center of the contact lens in the sectional image, the cross-sectional edge geometry corresponding to the convex and concave surface boundaries of the contact lens (1) in the sectional image, selecting a parameter defining the cross-sectional edge geometry of the contact lens (1) imaged and comparing the parameter defining the cross-sectional edge geometry of the contact lens (1) with a predetermined parameter defining a cross-sectional edge geometry of a non-inverted contact lens to determine whether said contact lens (1) is inverted, wherein the at least one sectional image further comprises the lens center, wherein the method further comprises determining a sagittal depth of the contact lens (1), and wherein comparing the determined sagittal depth with a predetermined sagittal depth of a non-inverted contact lens to determine whether said contact lens (1) is inverted, wherein the at least one sectional image further comprises the lens center, wherein the method further comprises determining a sagittal depth of the contact lens (1), and wherein comparing the determined sagittal depth with a predetermined sagittal depth of a non-inverted contact lens to determine whether said contact lens (1) is inverted.

2. Method according to claim 1, wherein the step of determining the cross-sectional edge geometry comprises determining a lens edge curvature radius of the convex surface (2, 3) or of the concave surface (3, 2) of the contact lens (1), and wherein the steps of selecting and comparing the parameter of the cross-sectional edge geometry comprise selecting the lens edge curvature radius of the convex surface (2, 3) or of the concave surface (3, 2) of the contact lens (1) as parameter defining the cross-sectional edge geometry and comparing said lens edge curvature radius with a predetermined lens edge curvature radius.

3. Method according to claim 2, wherein the step of determining whether said contact lens (1) is inverted comprises evaluating whether the determined lens edge curvature radius of the contact lens deviates more than 10%, from the predetermined lens edge curvature radius.

4. Method according to claim 1, wherein the at least one sectional image further comprises the lens center, wherein the method further comprises determining a lens diameter of the contact lens (1) and wherein the method further comprises comparing the determined lens diameter with a predetermined lens diameter of a non-inverted contact lens to determine whether said contact lens (1) is inverted.

5. Method according to claim 1, wherein the contact lens (1) is imaged in a container (30), in an inspection cuvette or in a base part of a blister package.

6. Method according to claim 5, wherein the contact lens (1) is imaged while placed in a volume of liquid in the container (30).

7. Method according to claim 5, wherein the sectional image is used to further determine the orientation of the contact lens (1) in the container (30).

8. Method according to claim 5, wherein the sectional image is used to further determine the Cartesein position of the contact lens (1) in the container (30).

9. Method according to claim 1, wherein the contact lens (1) is a silicone hydrogel lens.

* * * * *